US009885519B2

(12) United States Patent
Schmit et al.

(10) Patent No.: US 9,885,519 B2
(45) Date of Patent: Feb. 6, 2018

(54) METHOD AND INSTALLATION FOR DRYING A DAMP WEB

(71) Applicant: ANDRITZ PERFOJET SAS, Montbonnot (FR)

(72) Inventors: Laurent Schmit, Le Versoud (FR); Xavier Ayrault, Allevard les Bains (FR)

(73) Assignee: ANDRITZ PERFOJET SAS, Montbonnot (FR)

( * ) Notice: Subject to any disclaimer, the term of this patent is extended or adjusted under 35 U.S.C. 154(b) by 506 days.

(21) Appl. No.: 14/592,061

(22) Filed: Jan. 8, 2015

(65) Prior Publication Data

US 2015/0198368 A1    Jul. 16, 2015

(30) Foreign Application Priority Data

Jan. 15, 2014 (FR) ...................... 14 00077

(51) Int. Cl.

| | |
|---|---|
| *F26B 3/02* | (2006.01) |
| *F26B 21/00* | (2006.01) |
| *F26B 21/08* | (2006.01) |
| *D04H 1/492* | (2012.01) |
| *D21F 5/18* | (2006.01) |
| *D21F 5/20* | (2006.01) |
| *F26B 23/00* | (2006.01) |
| *F26B 13/16* | (2006.01) |

(52) U.S. Cl.
CPC ........... *F26B 21/004* (2013.01); *D04H 1/492* (2013.01); *D21F 5/18* (2013.01); *D21F 5/20* (2013.01); *F26B 13/16* (2013.01); *F26B 21/08* (2013.01); *F26B 23/002* (2013.01); *Y02P 70/405* (2015.11)

(58) Field of Classification Search
CPC ...... F26B 21/004; F26B 13/16; F26B 23/002; F26B 21/08; D04H 1/492; Y02P 70/405; D21F 5/18; D21F 5/20
USPC ... 432/59, 72, 143, 144, 145, 152, 155, 159, 432/176
See application file for complete search history.

(56) References Cited

U.S. PATENT DOCUMENTS

| | | |
|---|---|---|
| 6,551,461 B2 | 4/2003 | Hermans et al. |
| 2005/0132598 A1 | 6/2005 | Reddy |
| 2009/0283234 A1 | 11/2009 | Da Silva et al. |

FOREIGN PATENT DOCUMENTS

DE       28 02 156 B1    6/1979

OTHER PUBLICATIONS

French Search Report (Application No. FR 14 00077 (2 pages—dated Sep. 22, 2014).

*Primary Examiner* — Jessica Yuen
(74) *Attorney, Agent, or Firm* — Renner, Kenner, Greive, Bobak, Taylor & Weber

(57) ABSTRACT

An installation for drying a web of non-woven material includes a fan (6), a heating oven (3), an outlet pipe (C2) which puts the outlet of the oven (3) in communication with the intake of the fan (6), a branch pipe (C3) branching from the inlet pipe (C1) upstream of the heat source (4) putting the pipe (C1) in communication with the inlet of a drying device (10, 11), a pipe (C4) for the extraction of air from the drying device (10, 11) and a humidity level probe (13) mounted in the extraction pipe (C4).

6 Claims, 3 Drawing Sheets

METHOD AND INSTALLATION FOR DRYING A DAMP WEB

TECHNICAL FIELD

This invention relates to the field of paper production and the field of producing non-woven materials.

BACKGROUND ART

In the field of paper production and in the field of producing non-woven materials using the technique of bonding with jets of water, the webs tend to emerge damp after the forming and consolidation phase. In fact:
the production of paper requires mixing paper fibre with water in order to feed it onto a conveyor for forming and to encourage the bonding of the fibrous sheet by hydrogen bonds.
the method of bonding with jets of water uses pressurised jets of water for intertwining the fibres and therefore dampens the fibrous sheet in this way.

In said methods, the webs produced need to be dried by evaporation before they can be spooled.

To achieve this, it is common to use ovens with traversing air (OMEGA or flat type) to perform said drying operation in a production line.

FIG. 1 shows a block diagram of an oven with traversing air.

The web to be dried 1 circulates round a drum 2 (or on a conveyor in the case of a flat oven).

Pressurised hot air is injected into the hood 3 by means of a fan V1 6 (referred as the main fan) and a heat source 4 which heats the air. Said heat source 4 can be for example a gas burner or a heat exchanger (using oil, air or water).

The temperature of the hot air injected into the hood 3 is controlled by the influence of the heat source 4.

Said hot air then traverses the damp web and the drum 2 (or the conveyor in the case of a flat oven): by means of this method the water contained in the web is evaporated as the web advances on the drum 2 (or on the conveyor in the case of a flat oven). The air which has traversed the web is cooled and is charged with humidity. It is then suctioned inside of the drum 2 (or onto the conveyor in the case of a flat oven) by the fan V1 6, then re-heated by the heat source 4 and re-injected into the circuit and so forth.

The heat source 4 can be placed upstream or downstream of the fan V1 6. Preferably, it is placed upstream in the case of a gas burner and downstream in the case of a heat exchanger.

A portion of the cold and humid air needs to be evacuated outside of the circuit so as not to concentrate the humidity in the circulation circuit. Therefore, a portion of the cold and humid air is evacuated (5 to 30% of the total flow) by the branch pipe 5 by means of the pressure generated at the outlet by the fan V1 6 if this is sufficient or by means of an additional branch fan V2 8 if the pressure generated by the fan V1 6 is not sufficient.

The branch pipe can be connected upstream of V1.

The flow of branched air is controlled either by influencing the rotational speed of the fan V2 8 or by influencing the opening of the control flaps 9.

To address this deficit of air in the circuit reserve air from the production hall or outside the building is suctioned upstream of the fan V1 6 via the reserve pipe 7.

In the case of paper production, the air in the hood is usually heated to temperatures of about 200-250° C. The air extracted from the oven leaves at a temperature varying between 150 and 180° C.

In the case of the production of non-woven material which uses the water jet method of bonding, the air in the hood is usually heated to temperatures of about 100-150° C. The air extracted from the oven is evacuated preferably at a temperature varying between 70 and 120° C.

The drying temperatures for producing non-woven material which uses the method of water jet bonding are lower because some fibres forming the non-woven material (POLYPROPYLENE or POLYESTER for example) are sensitive when exposed to very high temperatures (with shrinkage of width of the web, reduction of the thickness of the web, yellowing of the web, alteration of the mechanical properties of the web).

Several improvement devices describe different ways of using the thermal energy from the air which is discharged by the oven through the extraction pipes.

In particular, in the case of paper production one of the improvement devices (cf. patents DE2802156B1 and U.S. Pat. No. 6,551,461) injects the still hot branched air above a drying box located upstream of the oven in order to start the method of drying the web upstream of the oven (and thus reduce the amount removed from the web on entry into the oven).

The branch air is supplied by means of a diffusion box 10 above a drying box 11 on which the web circulates.

Said drying box 11 can be integrated into a conveyor or into a cylinder.

The still hot air supplied in this way traverses the web and thereby evaporates a portion of the water contained in the web.

The air recovered by the drying box 11 (cold and humid) is then evacuated to the outside (by a final extraction fan for example).

The system described above functions perfectly well when the temperature of the air discharged by the oven is greater than 150° C. (in the case of paper production). In fact, at these temperatures, the relative humidity of the current of air which is discharged by the oven remains low (<5%).

During the passage of this current of air through the damp web on the drying box, its temperature drops again and the air is again charged with humidity. However, because of the favourable conditions upstream (raised temperature, low relative humidity), it is not possible for the suctioned air to reach saturation by traversing the web on the drying box and regenerate water on the web by condensation.

In the case of a non-woven web made by a water jet method of bonding, said system for improving the drying described in the patents DE2802156B1 and U.S. Pat. No. 6,551,461 does not function well.

It is noted that the web is dampened rather than dried.

DISCLOSURE OF THE INVENTION

The invention overcomes this disadvantage by a method for drying a damp web of non-woven material by passing hot air into an oven, through the damp web moved by a transport means, which hot air thus humidifies, by reheating a first portion of humidified air and passing it back into the oven through the damp web and by passing a second portion of humidified air into a drying device, upstream of the oven in the displacement direction of the web, through the displaced damp web, characterised in that the relative humidity of humidified air which leaves the drying device is controlled to a guide level of less than 100%.

It has been found that because the temperatures of the air current discharged by the oven are much lower (70° C.-120° C.) than for the production of paper, the relative humidity of this current can be fairly high (20-40%). Because of this there is an increased risk that the air current will reach the point of saturation when traversing the web on the drying box, which will result in rewetting the web rather than removing a portion of the water contained in the web. Furthermore, said condensation can continue into the suction box, and into the pipe leading to the extraction fan, preventing its correct functioning.

By regulating the relative humidity of the humidified air which leaves the drying device at a guide level of less than 100% the rewetting of the web is avoided.

The amount of energy needed to dry the product is minimised by fixing the guide level between 70 and 99% and preferably between 96 and 98%. The absence of water in liquid form at the inlet to the final extraction fan makes it possible to avoid the installation of an air/water separator upstream of the fan.

It is possible to prevent the relative humidity from exceeding the guide level by raising the temperature of the hot air. This is also possible by increasing the flow of hot air and/or the flow of the first portion of humidified air.

The air in the branch pipe can contain combustion gases (NOx, CO) which are dangerous for operators. It is good that all of the blown in air is suctioned off so as not to diffuse polluted air into the production room. For this purpose the flow of humidified air leaving the drying device is controlled so that it is greater than the flow of the second portion of humidified air. It is calculated for example Q extraction=K*Q branch, with K>1.

Preferred value: K=1.1.

The invention also relates to an installation for drying a non-woven web comprising:
a fan,
a heating oven with an inlet and an outlet,
an inlet pipe which puts the discharge of the fan in communication with the inlet of the oven and sends discharged air to the inlet of the oven,
a heat source arranged such that the air discharged into the inlet pipe is heated,
an outlet pipe which puts the outlet of the oven in communication with the intake of the fan,
a branch pipe, branching off from the inlet pipe upstream of the heat source, putting the inlet pipe in communication with the inlet of a drying device,
a transport means which moves a web in the drying device and in the oven, the drying device being upstream of the oven in the direction of movement of the web,
an extraction pipe for the air of the drying device,
a probe for the humidity level mounted in the extraction pipe for measuring the level of humidity in the air evacuated from the drying device,
the probe being connected to a control unit which compares the relative humidity to a guide level and which, if the relative humidity is greater than the guide level:
raises the temperature of the heat source and/or
increases the flow of air in the inlet pipe and/or
increases the flow of air in the branch pipe.

By mounting the probe for checking the humidity level in the extraction pipe, the probe is mounted downstream in the direction of the passage of air from the non-woven material web in the drying device, the probe being thus possibly mounted in the drying device itself. Preferably, an extraction fan is mounted in the extraction pipe preferably just downstream in the direction of the passage of air from the drying device. Preferably, an extraction fan is also mounted in the branch pipe and/or a flap for controlling the flow of air in the branch pipe. It is also preferably possible to provide a flowmeter mounted in the extraction pipe, a flowmeter mounted in the branch pipe and a control unit connected by signal technology to two flowmeters and controlling the flow in the extraction pipe such that it is greater than the flow in the branch pipe.

The control according to the invention influences the drying temperature of the oven and/or the rotational speed of the main fan of the oven and/or the rotational speed of the branch fan of the oven and/or the position of the control flaps. This control prevents the condensation of air on the web, since the air always has a relative humidity of less than 100%, in the drying box or downstream of the drying box forming part of the drying device.

For the production of given non-woven material:
the higher the drying temperature set in the oven the higher the temperature of the air extracted from the oven and the lower its relative humidity and therefore the lower the humidity of the air recovered in the drying box;
the greater the rotational speed of the branch fan of the oven, the greater the flow of air discharged by the oven and the lower the relative humidity of the air current discharged and therefore the lower the humidity of the air recovered in the drying box;
the more the control flaps located on the branch pipe of the oven are open the greater the flow of air discharged by the oven and the lower the relative humidity of the discharged current of air therefore the lower the humidity of air recovered in the drying box;
the greater the rotational speed of the main fan of the oven, the greater the flow of air discharged by the oven and the lower the relative humidity of the discharged air current and therefore the lower the humidity of the air recovered in the drying box.

BRIEF DESCRIPTION OF THE DRAWINGS

In the accompanying drawings given solely by way of example.

PREFERRED EMBODIMENTS FOR CARRYING OUT THE INVENTION

Figure 1:
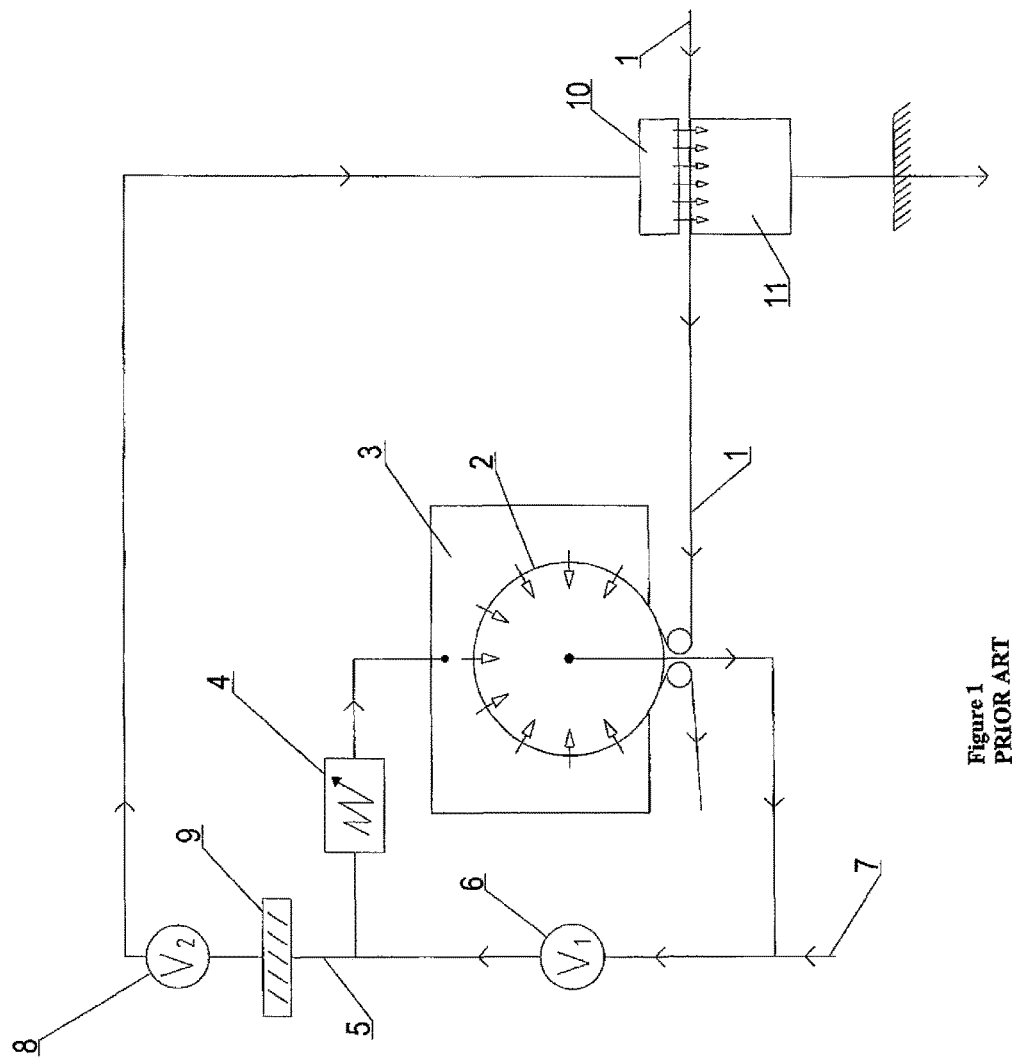
FIG. 1 is a diagram illustrating the prior art.
Figure 2:
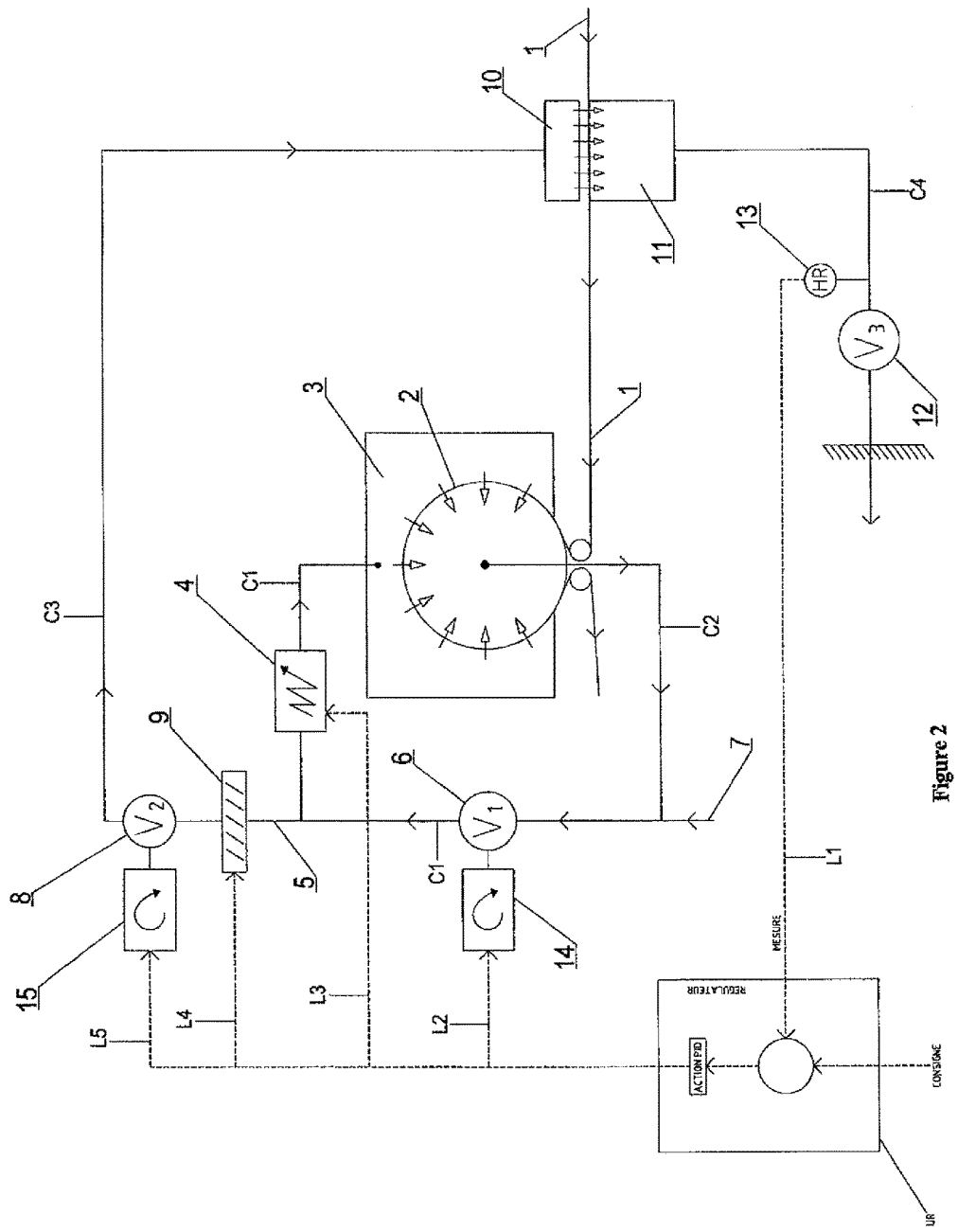
FIG. 2 is a circulation diagram illustrating the invention.

In FIG. 2, the web to be dried 1 circulates around a drum 2 (or on a conveyor).

Hot air is injected under pressure through an inlet pipe C1 into the hood 3 by means of a fan V1 6 (referred to as the main fan) and a heat source 4 which reheats the air. Said heat source 4 can be for example a gas burner or a heat exchanger (using oil, air, water or electricity).

Said hot air then traverses the damp web and the drum 2 (or the web of the conveyor) by this method, the water contained in the web is evaporated as the web advances over the drum 2 (or on the conveyor). The air which has traversed the web is cooled and charged with humidity. It is them sucked via an extraction pipe C2 to the inside of the drum 2 by the fan V1 6, then reheated again by the heat source 4 and reinjected into the circuit and so on.

The heat source 4 can be placed upstream or downstream of the fan V1 6. Preferably, it is placed downstream as described in the figure in the case of an exchanger and upstream in the case of a gas burner.

The motor of the fan V1 6 is driven by a frequency converter 14.

The temperature of the hot air injected into the hood 3 is controlled by the action of the heat source 4.

A portion of the cooled and humid air is evacuated out of the circuit so as not to concentrate the humidity in the circulation circuit. Therefore, a portion of cooled and humid air is evacuated through the branch pipe C3 by means of the pressure generated at the output by the fan V1 (6) if it is sufficient or by means of an additional branch fan V2 (8).

The branch pipe C3 can be connected upstream of V1.

Flaps 9 can be installed in the branch pipe C3 in order to be able to control the amount of extracted flow.

If there is a branch fan V2 (8), the motor of this fan can be driven by a frequency converter. If there are control flaps 9, said drive by converter is not necessary.

To address this deficit of air in the circuit, reserve air from the production hall or outside the building is suctioned upstream of the fan V1 6 via the reserve pipe 7.

The cooled and humid air evacuated by the branch pipe C3 is then injected into a diffusion box 10 which diffuses the air above a drying vacuum box 11 arranged upstream of the oven 3 on which the web to be dried circulates.

Said drying vacuum box 11 can be arranged either in a conveyor (support web=conveyor web), or in a cylinder (support web=nickel cylinder, perforated metal sheet, metal web).

The air is suctioned into the drying box 11 by a final extraction fan V3 12. Preferably, said fan 12 is positioned closest to the drying box 11.

A probe for measuring relative humidity 13 is installed in the drying box 11 or downstream of the drying box 11. Preferably, it is installed just upstream of the fan 12 in an extraction pipe C4.

Said probe 13 measures the relative humidity of the air in the drying box 11 or downstream of the drying box. Preferably, the measurement is performed just upstream of the final extraction fan 12.

The relative humidity measured in the drying box 11 or downstream of the drying box 11 (preferably just upstream of the final extraction fan 12) is controlled at a level of less than 100% by influencing the drying temperature of the oven and/or the rotational speed of the main fan V1 6 of the oven and/or the rotational speed of the branch fan V2 8 of the oven and/or the position of the control flaps 9.

The signal of relative humidity is sent via a line L1 to a control unit UR which compares the signal with a guide level and sends control signals as a result to the fan 6 via line L2, to the heat source 4 via line L3, to the flap 9 via line L4 and/or to the fan 8 (to its converter 15) via line L5.

Figure 3:
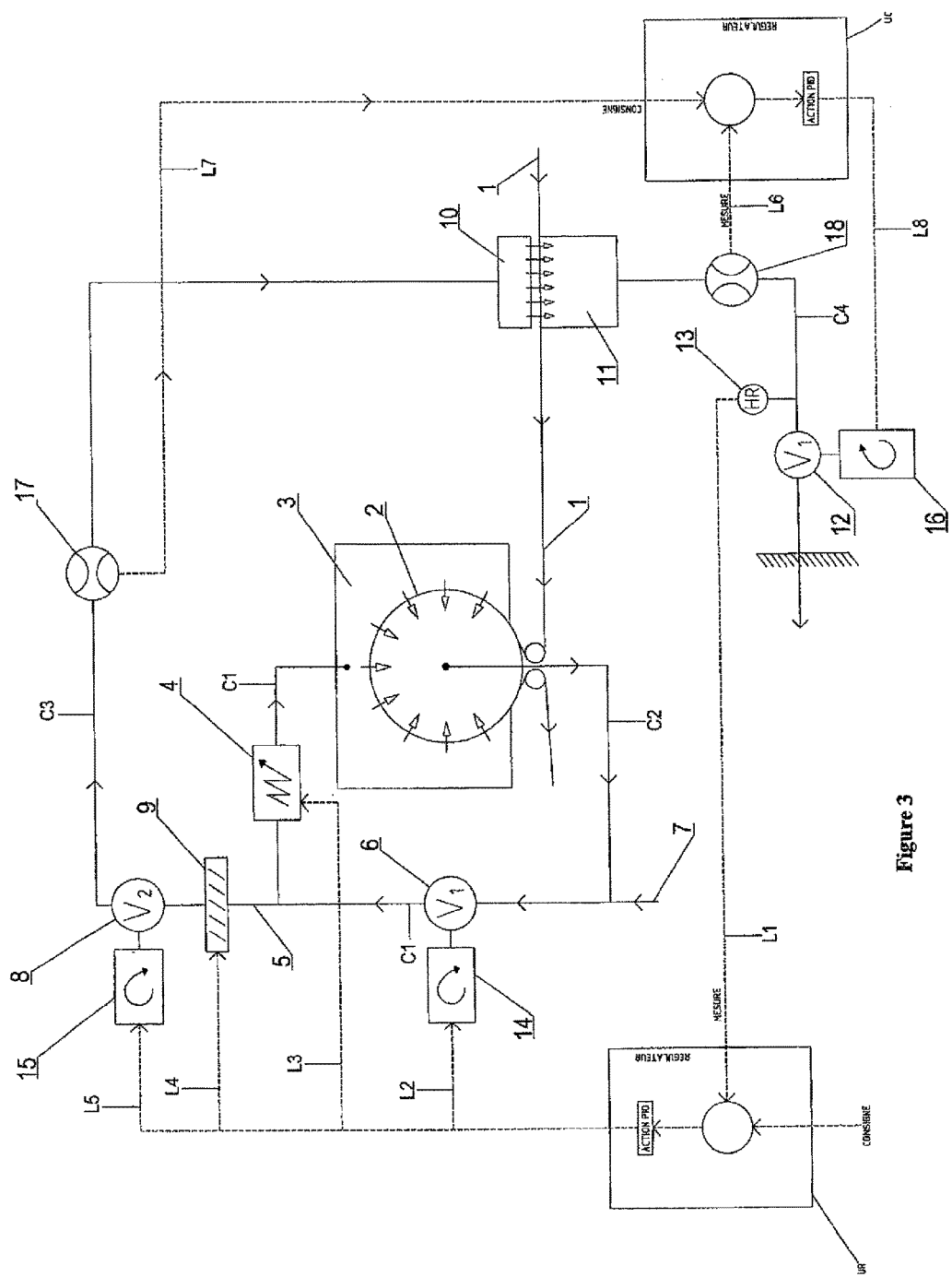
FIG. 3 is diagram similar to FIG. 2 illustrating a variant.

In another manner of implementing the invention (cf. FIG. 3), it is possible to add the following elements to the configuration described in FIG. 2:

The motor of the fan V3 12 is driven by a frequency converter 16.

A flowmeter 17 measures the flow extracted by the oven in the branch pipe C3. Said flowmeter can be installed in front of or after the branch fan V2 8.

A flowmeter 18 measures the flow of air suctioned by the drying suction box 11. Said flowmeter can be installed in front of or after the final extraction fan V3 12.

The air extracted by the oven can contain combustion gases (NOx, CO) which can be dangerous for operators working on the production line. To ensure that the system functions correctly it is imperative that 100% of the flow blown in by the diffusion box is suctioned off by the drying box, otherwise polluted air will be diffused into the production room.

To satisfy this requirement a control system makes it possible to control the amount of flow suctioned by the drying box (measured by the flowmeter 18) as a function of the flow in the branch pipe (measured by the flowmeter 17) by means of lines L6, L7 and L8.

It is calculated for example Q extraction=K*Q branch, with K>1.

Preferred value: K=1.1

EXAMPLES

Example of production without the system according to the invention (corresponds to the configuration described for FIG. 2):

A web of 45 gsm 50% Viscose 50% PET to 220 m/min is produced with a machine width of 3500 mm.

4 injectors are used for bonding the web at pressures of 50-80-120-120 bars with strips of type 2J14-2J14-2J14-1J7

Strip 2J14=2 rows, diameter of the holes=120 μm, centre-to-centre of holes=1.4 mm Strip 1J7=1 row, diameter of the holes=120 μm, centre-to-centre of holes=0.7 mm The wet web then passes onto a dewatering conveyor by vacuum provided with:

1 low vacuum dewatering box: slot width=10 mm, vacuum=−100 mbar 1 high vacuum dewatering box: slot width=8 mm, vacuum=−400 mbar The web of the conveyor has a permeability of about 800 cfm.

The drying box (11), fed from above by the diffusion box (10), is integrated into said conveyor, downstream of the 2 dewatering boxes. Said drying box has a slot width of 600 mm.

Just upstream of said drying box (after the 2 dewatering boxes), the wetting level of the web is 120% (=120 g water for 100 g dry web).

When the web has passed underneath the drying box it is then transported up to the oven to be completely dried.

The oven which is used for drying said web is provided with a branch fan V2 8 and a main fan V1 6. The motors of these 2 fans are controlled by frequency converter.

The heat source 4 is a gas burner.

The branch piping of said oven is connected to the diffusion box 10.

In order to obtain a dry web at the outlet of the oven, the following guide levels were applied in the oven:

T° level air in the hood 3: 120° C.

% V1=70%

% V2=85%.

The temperature and the humidity of the air extracted by the branch piping are increased:

T° C.=82° C. HR=20% (70 g water/kg dry air)

The temperature and the humidity of air in the drying box 11 are measured:

T° C.=43° C. HR=100%

The presence of droplets of water is noted in said drying box.

The air in the drying box has therefore reached saturation.

Just after the drying box 11 (ahead of the oven) the web is measured as having a wetting level of 130%.

This value is greater than the value measured just upstream of the drying box (120%).

The web has therefore been rewetted by the current of air arriving from the branched casing of the oven.

The system of the diffusion box+drying box has not therefore been able to lower the wetting level of the web prior to the oven and does not provide a satisfactory result.

In these conditions, the oven uses a total of 2410 Kw, divided into:

2320 Kw gas
90 Kw electricity.

Example of the same requirement of production with the system according to the invention (corresponds to the configuration described in FIG. 3 or 4): the speed of the branch fan V2 is regulated to obtain the relative humidity desired upstream of the final extraction fan V3.

A web of 45 gsm 50% viscose 50% PET to 220 m/min is produced with a machine width of 3500 mm.

4 injectors are used for bonding the web, at pressures of 50-80-120-120 bar with strips of the type 2J14-2J14-2J14-1J7

Strip 2J14=2 rows, diameter of the holes 120 μm, centre-to-centre of holes=1.4 mm Strip 1J7=1 row, diameter of the holes=120 μm, centre-to-centre of holes=0.7 mm The wet web can then passes onto a dewatering conveyor by vacuum provided with:

1 low vacuum dewatering box: slot width=10 mm, vacuum=−100 mbar
1 high vacuum dewatering box: slot width=8 mm, vacuum=−400 mbar The web of the conveyor has a permeability of about 800 cfm.

The drying box 11, fed from above by the diffusion box 10, is integrated into this conveyor downstream of the 2 dewatering boxes. Said drying box has a slot width of 600 mm.

Just upstream of this drying box (after the 2 dewatering boxes) the wetting level of the web is 120% (=120 g water for 100 g dry web).

When the web has passed underneath the drying box it is then transported up to the oven to be completely dried.

The oven which is used for drying said web is provided with a branch fan V2 8 and a main fan V1 6. The motors of these 2 fans are controlled by a frequency converter.

The source of heat 4 is a gas burner.

The branch piping of said oven is connected to the diffusion box 10.

The drying box 11 is connected to a fan V3 12. Just upstream of said fan a probe 13 is installed which measures the relative humidity of the air current.

The speed of the branch fan V2 is controlled to obtain the desired relative humidity upstream of the final extraction fan V3.

A guide level of 95% is set for said relative humidity.

In order to obtain a dry web at the outlet of the oven, the following guide levels were applied in the oven:

T° guide level air in the hood 3: 120° C.
% V1=55%

The control stabilised the value of the speed of rotation of the fan V2 at 95%.

The temperature and relative air humidity extracted by the branch piping are increased:

T° C.=95° C. HR=10% (57 g water/kg dry air)

The temperature and the humidity of the air in the drying box 11 are measured:

T° C.=47° C. HR=95% (69 g water/kg dry air)

The air traversing the web on the drying box recovered 69−57=12 g water/kg air. This quantity corresponds to the amount of water which was extracted from the web by evaporation on said drying box.

The wetting level of the web is checked just after the drying box: the measurement is 101%.

This value is therefore much lower than the value measured just upstream of the drying box (120%).

The web has therefore been partially dried this time by the current of air from the branch casing of the oven!!

The air was not condensed in the diffusion box.

In these conditions, the oven uses a total of 1860 Kw, divided into:

1805 Kw gas
55 Kw electricity

Example of the same requirement of production with the system according to the invention (corresponds to the configuration described for FIG. 3 or 4): the temperature of the air injected into the hood is controlled to obtain the desired relative humidity upstream of the final extraction fan V3.

A web 45 of gsm 50% Viscose 50% PET to 220 m/min is produced on a machine width of 3500 mm.

4 injectors are used or bonding the web, at pressures of 50-80-120-120 bar with strip types 2J14-2J14-2J14-1J7

Strip 2J14=2 rows, diameter of the holes=120 μm, centre-to-centre of holes=1.4 mm Strip 1J7=1 row, diameter of the holes=120 μm, centre-to-centre of holes=0.7 mm The wet web then passes onto a dewatering conveyor by vacuum provided with:

1 low vacuum dewatering box: slot width=10 mm, vacuum=−100 mbar
1 high vacuum dewatering box: slot width=8 mm, vacuum=−400 mbar The web of the conveyor has a permeability of about 800 cfm.

The drying box 11, fed from above by the diffusion box 10, is integrated into said conveyor downstream of the 2 dewatering boxes. Said drying box has slot width of 600 mm.

Just upstream of said drying box (after the 2 dewatering boxes), the wetting level of the web is 120% (=120 g water for 100 g dry web).

When the web has passed underneath the drying box it is then transported up to the oven to be completely dried.

The oven which used for drying said web is provided with a branch fan V2 8 and a main fan V1 6. The motors of these 2 fans are controlled by frequency converter.

The heat source 4 is a gas burner.

The branch piping of said oven is connected to the diffusion box 10.

The drying box 11 is connected to a fan V3 12. Just upstream of said fan a probe 13 is installed which measures the relative humidity of the air current.

The temperature of the air injected into the hood is controlled to obtain the desired relative humidity upstream of the final extraction fan V3.

A guide level of 95% is set for said relative humidity.

In order to obtain a dry web at the exit of the oven, the following guide levels were applied in the oven

% V1=50%
% V2=85%

The control stabilised the temperature of the air injected into the hood at 130° C.

The temperature and the relative air humidity extracted by the branch piping are increased:

T° C.=99° C. HR=10% (67 g water/kg dry air)

The temperature and the humidity of the air in the drying box 11 are measured:

T° C.=51° C. HR=95% (82 g water/kg dry air)

The air traversing the web on the drying box recovered 82−67=15 g water/kg air. This quantity corresponds to the amount of water which was extracted from the web by evaporation on said drying box.

The wetting level of the web is checked just after the drying box: the measurement is 105%.

This value is therefore much lower than the value measured just upstream of the drying box (120%).

This time the web has therefore been partially dried by the current of air from the branch casing of the oven!!

The air was not condensed in the diffusion box.

In these conditions the oven uses a total of 1935 Kw, divided into:

1897 Kw gas

38 Kw electricity.

What is claimed is:

1. Installation for drying a web of non-woven material characterised in that it comprises:
    a fan (6),
    a heating oven (3) with an inlet and an outlet,
    an inlet pipe (C1) which puts the discharge of the fan (6) in communication with the inlet of the oven (3) and sends discharged air to the inlet of the oven,
    a heat source (4) arranged such that the air discharged into the inlet pipe (C1) is heated,
    an outlet pipe (C2) which puts the outlet of the oven (3) in communication with the intake of the fan (6),
    a branch pipe (C3), branching off from the inlet pipe (C1) upstream of the heat source (4), putting the inlet pipe (C1) in communication with the inlet of a drying device (10, 11),
    a transport means (2) which moves a web in the drying device (10, 11) and in the oven (3), the drying device (10, 11) being upstream of the oven (3) in the direction of movement of the web,
    an extraction pipe (C4) for the air of the drying device (10, 11),
    a probe (13) for the humidity level mounted in the extraction pipe (C4) for measuring the level of humidity in the air evacuated from the drying device (10, 11),
    the probe (13) being connected to a control unit which compares the relative humidity to a guide level and which, if the relative humidity is greater than the guide level:
    raises the temperature of the heat source (4) and/or
    increases the flow of air in the inlet pipe (C1) and/or
    increases the flow of air in the branch pipe (C3).

2. Installation according to claim 1, characterised by a branch fan (8) mounted in the branch pipe (C3).

3. Installation according to claim 1, characterised by a flap (9) for controlling the flow of air in the branch pipe (C3).

4. Installation according to claim 1, characterised by an extraction fan mounted in the extraction pipe (C4).

5. Installation according claim 4 wherein the extraction fan is mounted in the extraction pipe (C4) just downstream of the direction of the passage of air of the drying device (10, 11).

6. Installation according to claim 1, characterised by a flowmeter (18) mounted in the extraction pipe (C4), by a flowmeter (17) mounted in the branch pipe (C3) and by a control unit (UC) connected by signal technology to flowmeters (17) and (18) and controlling the flow in the extraction pipe (C4) such that it is greater than the flow in the branch pipe (C3).

* * * * *